(No Model.)
D. J. & S. FARMER.
FLUID PRESSURE REGULATOR.
No. 592,198. Patented Oct. 19, 1897.
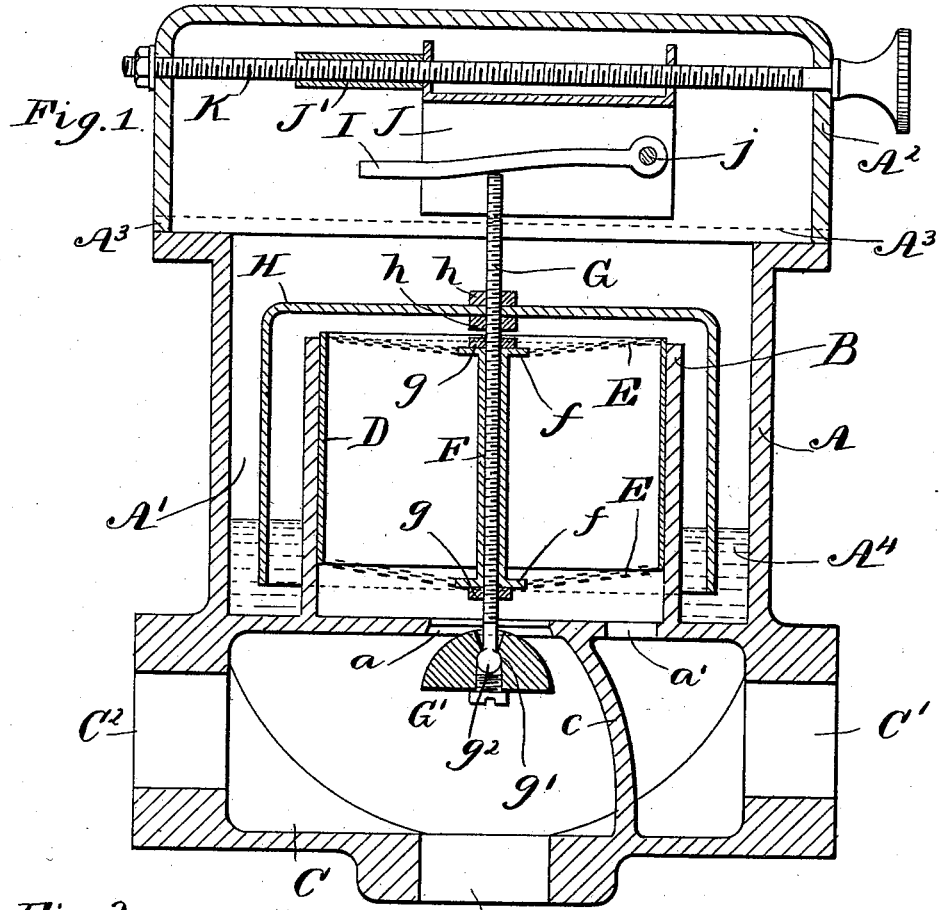
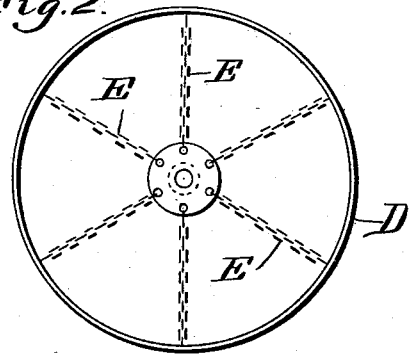
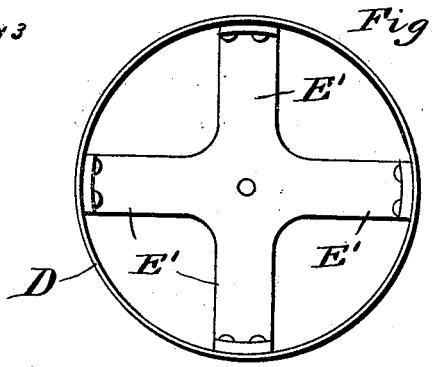
WITNESSES:
Milton T. Weston.
O. C. Wing.
INVENTORS
David J. Farmer and
Samuel Farmer
BY
Barr Deemer & Co.
ATTORNEY.

UNITED STATES PATENT OFFICE.

DAVID J. FARMER AND SAMUEL FARMER, OF ELIZABETH, NEW JERSEY.

FLUID-PRESSURE REGULATOR.

SPECIFICATION forming part of Letters Patent No. 592,198, dated October 19, 1897.

Application filed January 28, 1897. Serial No. 621,132. (No model.)

*To all whom it may concern:*

Be it known that we, DAVID J. FARMER and SAMUEL FARMER, citizens of the United States, and residents of Elizabeth, county of Union, and State of New Jersey, have invented certain new and useful Improvements in Gas-Governors, of which the following is a specification, reference being had to the accompanying drawings, forming a part thereof, in which similar letters of reference indicate corresponding parts.

This invention relates to improvements in gas-governors, and more particularly refers to service or meter governors to regulate the pressure at the meter or service-pipe supplying individual consumers; but the device is also applicable for district use, where laterals or pipes are led from the mains to a number of consumers, where it is found necessary to reduce the pressure of gas for consumption.

The pressure in the mains is found in all districts to vary, depending upon natural conditions arising from elevations and depressions of the ground through which the mains are laid, and therefore more pressure of gas is required in one part of a district than another, and our governor regulates the pressure in accordance with the specific requirements of the location in which the mains are placed and equalizes the pressure of gas supplied to the entire district. The mains in a district also sometimes vary in size, and our improvement will effectually regulate the local pressure for each individual main, thus supplying equal pressure of gas to all consumers.

Much difficulty has been experienced with governors now in common use, owing to the fact that their valve-stems become coated with an accumulation of foreign matter arising from the gas and clogged within the bearings through which they are journaled, whereby the governor becomes inoperative. Further, these governors become inoperative if they are not maintained in a perfectly upright position, owing to the friction of the valve-stems in their bearings.

Our improvement overcomes these difficulties and avoids all possible friction either by any accumulation on the valve-stem or by governor not being set upright or plumb, owing to the improved means we employ for mounting the valve-stem. Governors now in use also require weights placed on the float attached to valve-stem to give the required gas-pressure, and this construction necessitates opening the governor over the float to adjust the weights for changing the pressure.

Our improvement obviates the necessity of opening the governor or placing weights on the float for controlling the pressure.

The main object of our invention is to supply an apparatus so constructed that it will operate without friction, and positively control and regulate the pressure of gas passing from the mains to the consumer, whereby an even pressure is constantly maintained, further objects being to supply a valve that will seat freely and accurately and to enable the consumer to regulate the pressure of gas from the outside without opening the governor.

The invention will be hereinafter fully described and specifically set forth in the annexed claims.

In the accompanying drawings, forming part of this specification, Figure 1 is a vertical sectional elevation of our improved governor. Fig. 2 is a plan view of a detail thereof, and Fig. 3 is a similar view illustrating a slight modification.

In the practice of our invention we employ, primarily, a cylindrical casing A, having a compartment or tank A' therein, which tank has a cylindrical compartment B extended upwardly from the bottom thereof, said bottom having a valve-seat $a$ and an outlet-opening $a'$ formed therethrough. Below the casing A is a compartment C, adapted for receiving the gas. This said compartment has a wall $c$ therein, separating the outlet C' from the inlets $C^2$ and $C^3$.

Mounted within the compartment B is a cylinder D, which has a series of radial flexible arms E projected therefrom. These said arms are connected to flanges $f$ of a collar F, which collar surrounds the valve-stem G, said stem being screw-threaded throughout its entire length for engaging with nuts $g$, adapted to secure the collar F to the stem. Secured also to the stem G, by means of nuts $h$, is a float H.

Connected to the lower end of the stem G is a semispherical valve G', which valve has a socket $g'$ therein for engagement with a ball $g^2$, forming part of the lower end of the valve-stem, whereby the valve may be seated securely within the seat $a$, even though the device may be placed slightly out of plumb.

Resting upon the upper end of the valve-stem G is a loosely-pivoted swinging weight I, which said weight is mounted upon a spindle $j$ of an adjustable carriage J, said carriage being susceptible of lateral adjustment by means of a screw K, which is threaded through a collar J', forming part of the carriage, and is journaled within a box $A^2$, extended upwardly from the head $A^3$, adapted for closing the cylinder A.

In the operation of the device the gas enters either of the inlets $C^2$ or $C^3$ and thence passes upwardly through the opening $a$, downwardly through the opening $a'$, and out through the outlet C'. When the pressure is too strong, back pressure will force the float upwardly to partially close the valve, whereby pressure is reduced, the reservoir A' being of course supplied with a filling of any suitable liquid $A^4$ for preventing the gas from escaping around the float.

The object of the swinging weight I is to gage the amount of pressure required to lift the float, and the said weight can be readily adjusted for increasing or decreasing the leverage by turning the screw K in either a right or left hand direction.

We do not confine ourselves to the use of our device for supporting the valve-stem and regulating mechanism to small governors, as the invention may be applied to larger governors—such, for instance, as are used at gas-works—and if found desirable a lever may be attached to the upper end of the valve-stem, having a laterally-movable weight thereon for adjusting and gaging the pressure instead of the swinging weight illustrated in the drawings. Further, we do not wish to confine ourselves to the chains illustrated in the drawings as a means for supporting the valve-stem, as any other flexible support may be used—for instance, the leather arms $E^6$, as illustrated in Fig. 3 of the drawings.

Having thus described our invention, what we claim as new, and desire to secure by Letters Patent, is—

1. A gas-governor having a suspended valve therein, said valve being supported by radially-extended chains connected to the stem thereof, substantially as shown and described.

2. In a gas-governor, the combination of chains or equivalent loosely-hanging supports, a valve-stem and a sleeve surrounding the stem attached to said supports, a cylinder to which are attached the outer ends of said supports, and a casing inclosing the said parts, substantially as and for the purpose set forth.

3. In a gas-governor, the combination of chains or loose flexible supports, and a valve-stem having a valve thereon, and a float attached to the stem, substantially as shown and described.

4. In a gas-governor, the valve having an internal ball-bearing, in combination with a valve-stem having a ball on its lower end and an adjusting-screw to hold said ball closely in its seat as described and set forth.

5. In a gas-governor, the combination of a float and a casing having a reservoir therein, and a valve-stem having a sleeve thereon, and chains for supporting the valve-stem and a valve mounted to the stem by means of a ball-and-socket joint, and a laterally-adjustable weight resting upon the upper end of the valve-stem, substantially as shown and described.

6. In a gas-governor, the combination of a moving carriage having a weighted lever thereon, the surface of said lever resting on and sliding over the top upper end of a vertical valve-stem for changing the leverage to increase or diminish the pressure of gas as herein described and set forth.

7. In a gas-governor, the combination of a movable carriage and weighted lever located thereon, said weight resting on the valve-stem and adapted to be adjusted thereon laterally for changing the leverage thereof to regulate pressure of gas, substantially as shown and described.

8. In a gas-governor, the combination of the laterally-movable carriage, a pivoted lever and a threaded rod for adjusting the carriage; with the suspended valve and stem, substantially as shown and described.

In testimony that we claim the foregoing as our invention we have signed our names, in presence of two witnesses, this 25th day of January, 1897.

DAVID J. FARMER.
SAMUEL FARMER.

Witnesses:
SAMUEL E. FARMER,
C. ADDISON SWIFT.